No. 738,479. PATENTED SEPT. 8, 1903.
W. R. PIHL & A. OLSEN.
MACHINE FOR MAKING NETS.
APPLICATION FILED JULY 6, 1901.
NO MODEL. 12 SHEETS—SHEET 1.
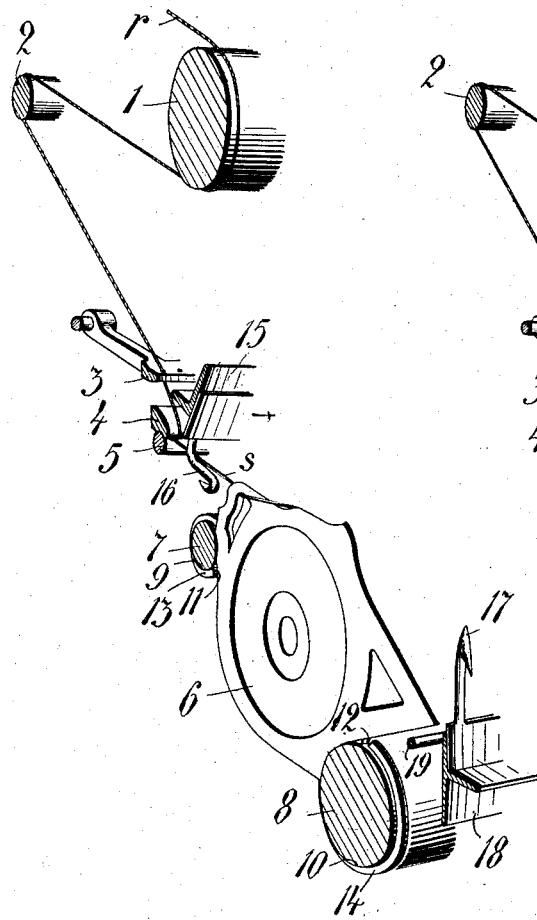
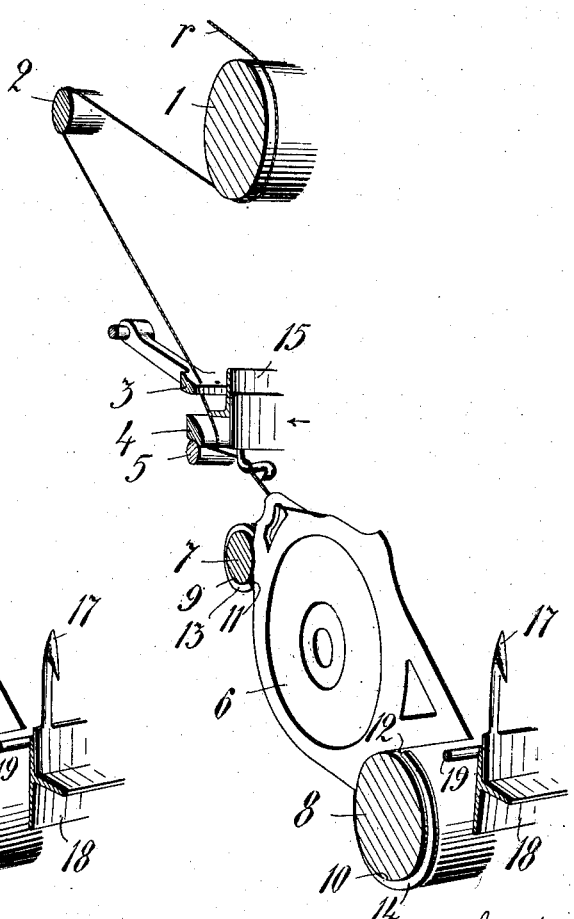

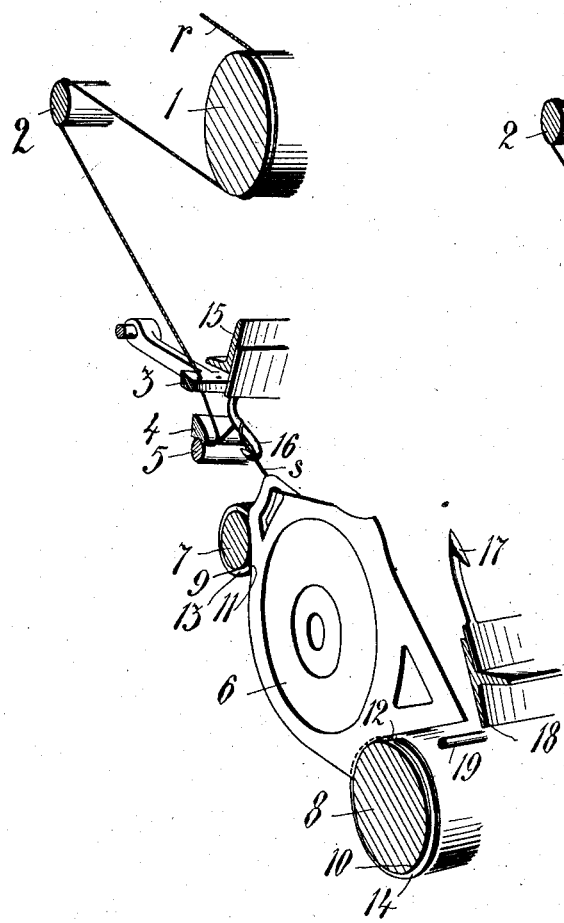
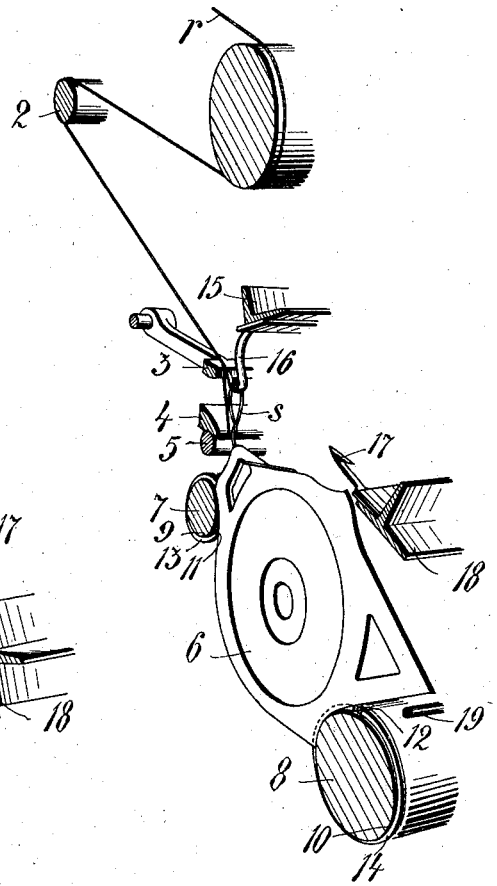

Fig. 5.
Fig. 6.
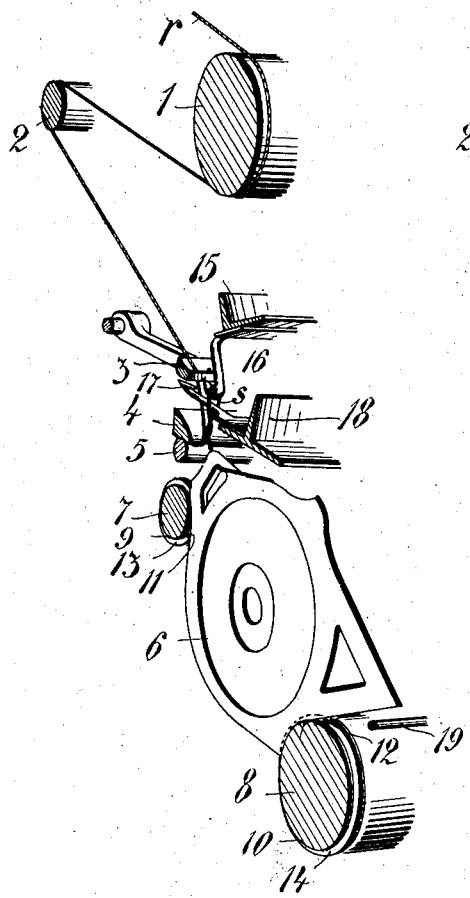
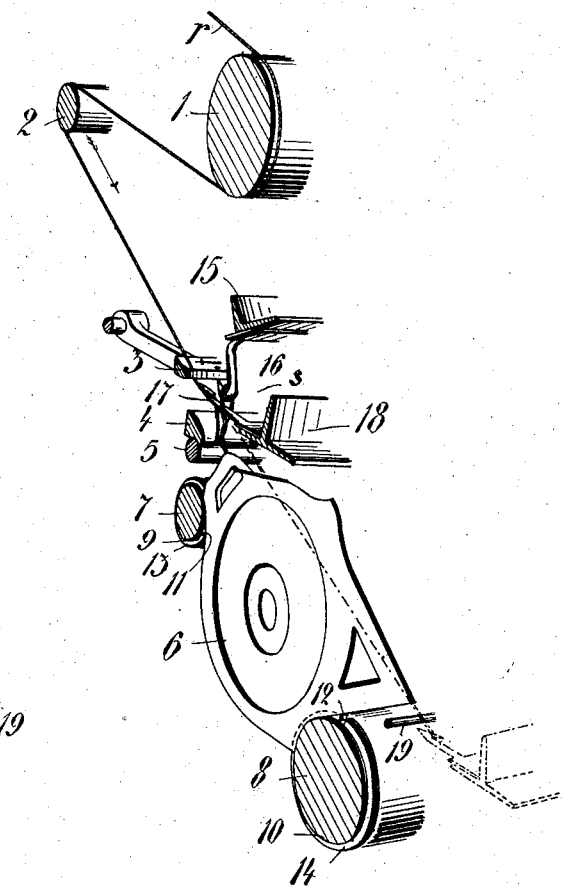

No. 738,479. PATENTED SEPT. 8, 1903.
W. R. PIHL & A. OLSEN.
MACHINE FOR MAKING NETS.
APPLICATION FILED JULY 6, 1901.
NO MODEL. 12 SHEETS—SHEET 4.
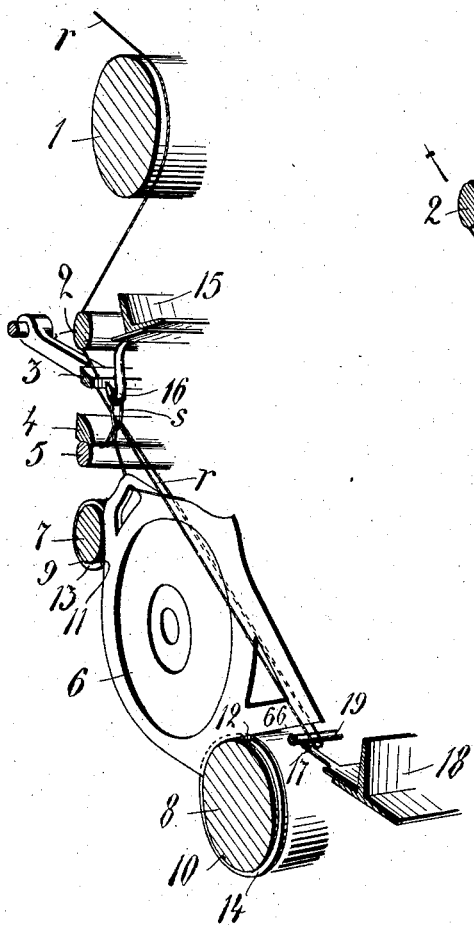
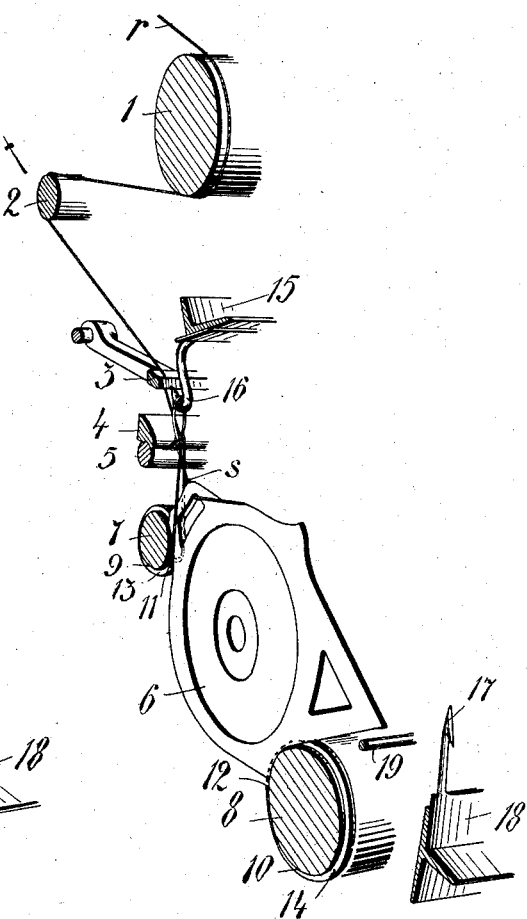

No. 738,479. PATENTED SEPT. 8, 1903.
W. R. PIHL & A. OLSEN.
MACHINE FOR MAKING NETS.
APPLICATION FILED JULY 6, 1901.
NO MODEL. 12 SHEETS—SHEET 5.

No. 738,479. PATENTED SEPT. 8, 1903.
W. R. PIHL & A. OLSEN.
MACHINE FOR MAKING NETS.
APPLICATION FILED JULY 6, 1901.
NO MODEL. 12 SHEETS—SHEET 6.
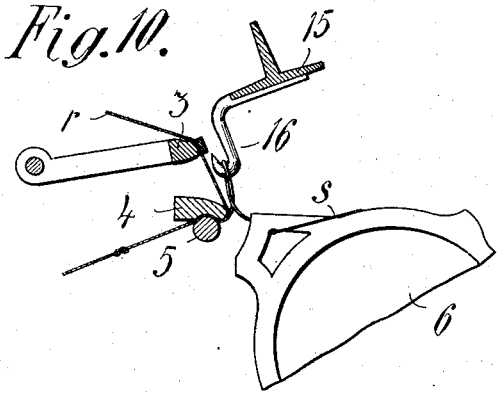
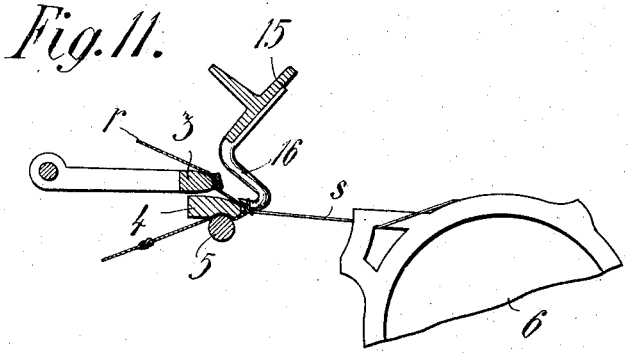
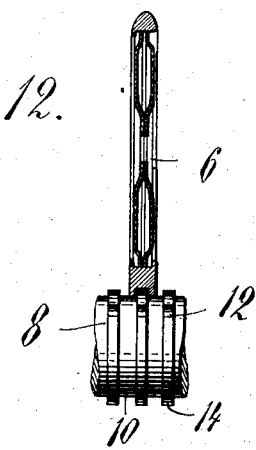
Witnesses:
Inventors
William Roberton Pihl.
Anton Olsen.
by
Att'y

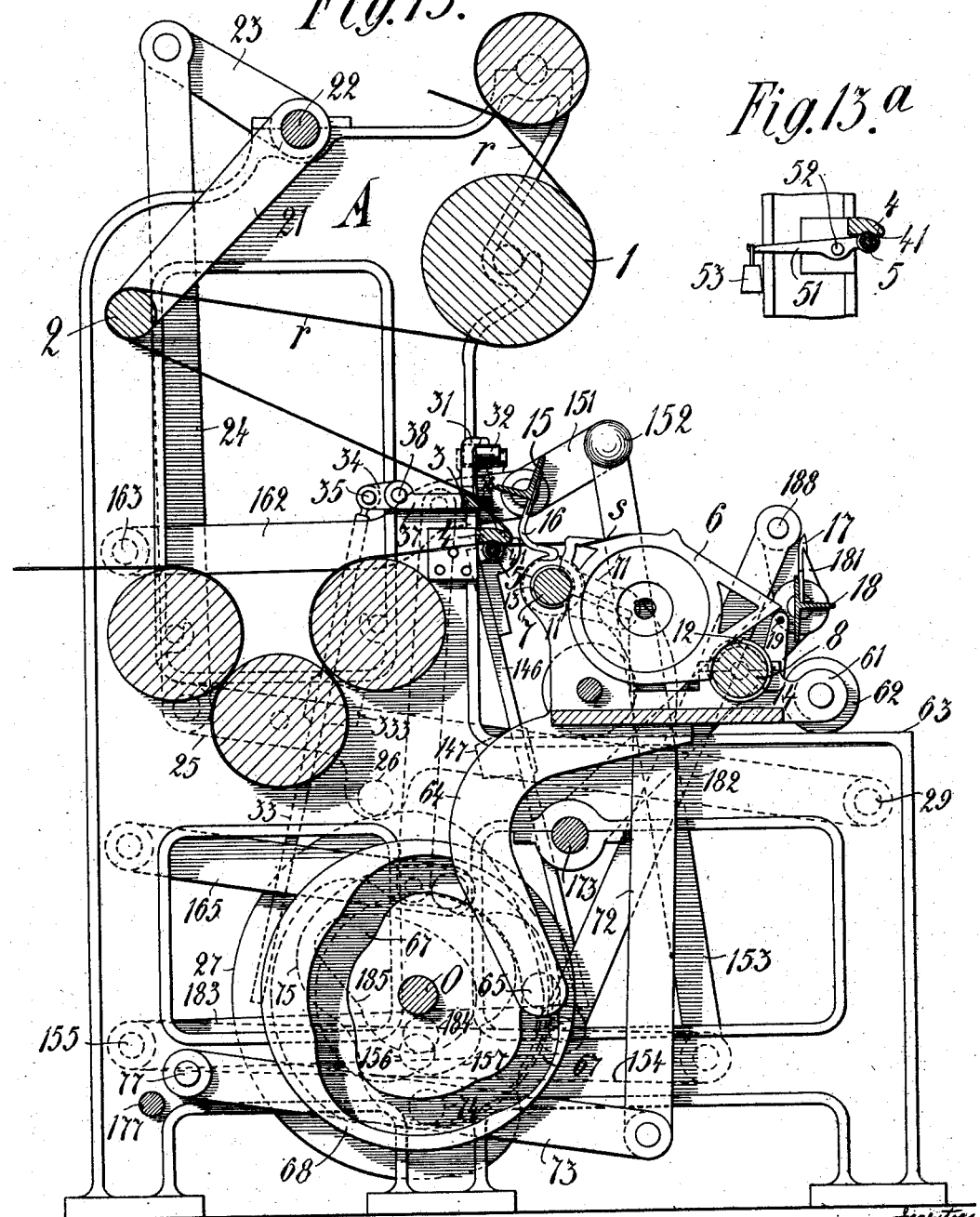

No. 738,479. PATENTED SEPT. 8, 1903.
W. R. PIHL & A. OLSEN.
MACHINE FOR MAKING NETS.
APPLICATION FILED JULY 6, 1901.
NO MODEL. 12 SHEETS—SHEET 8.

No. 738,479. PATENTED SEPT. 8, 1903.
W. R. PIHL & A. OLSEN.
MACHINE FOR MAKING NETS.
APPLICATION FILED JULY 6, 1901.
NO MODEL. 12 SHEETS—SHEET 11.

No. 738,479. PATENTED SEPT. 8, 1903.
W. R. PIHL & A. OLSEN.
MACHINE FOR MAKING NETS.
APPLICATION FILED JULY 6, 1901.
NO MODEL. 12 SHEETS—SHEET 12.

*Fig. 18.*

No. 738,479. Patented September 8, 1903.

UNITED STATES PATENT OFFICE.

WILLIAM ROBERTON PIHL AND ANTON OLSEN, OF CHRISTIANIA, NORWAY.

MACHINE FOR MAKING NETS.

SPECIFICATION forming part of Letters Patent No. 738,479, dated September 8, 1903.

Application filed July 6, 1901. Serial No. 67,301. (No model.)

*To all whom it may concern:*

Be it known that we, WILLIAM ROBERTON PIHL and ANTON OLSEN, subjects of the King of Sweden and Norway, residing at Christiania, Norway, have invented certain new and useful Improvements in Machines for Making Nets; and we do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

Our invention relates to machines for making nets, especially fishing-nets; and it consists in improvements in the means for forming the knots and in the construction and arrangements of the tools and mechanisms for performing this work, whereby the machine and its operation are simplified, the forming of the knots performed in less time and with less liability to tearing off the thread on account of frictional resistance between the thread and the tools, and also with less liability to failure in drawing tight the knots so that "sliding knots" are not formed.

Our improved machine is illustrated in the annexed drawings.

Figure 14:
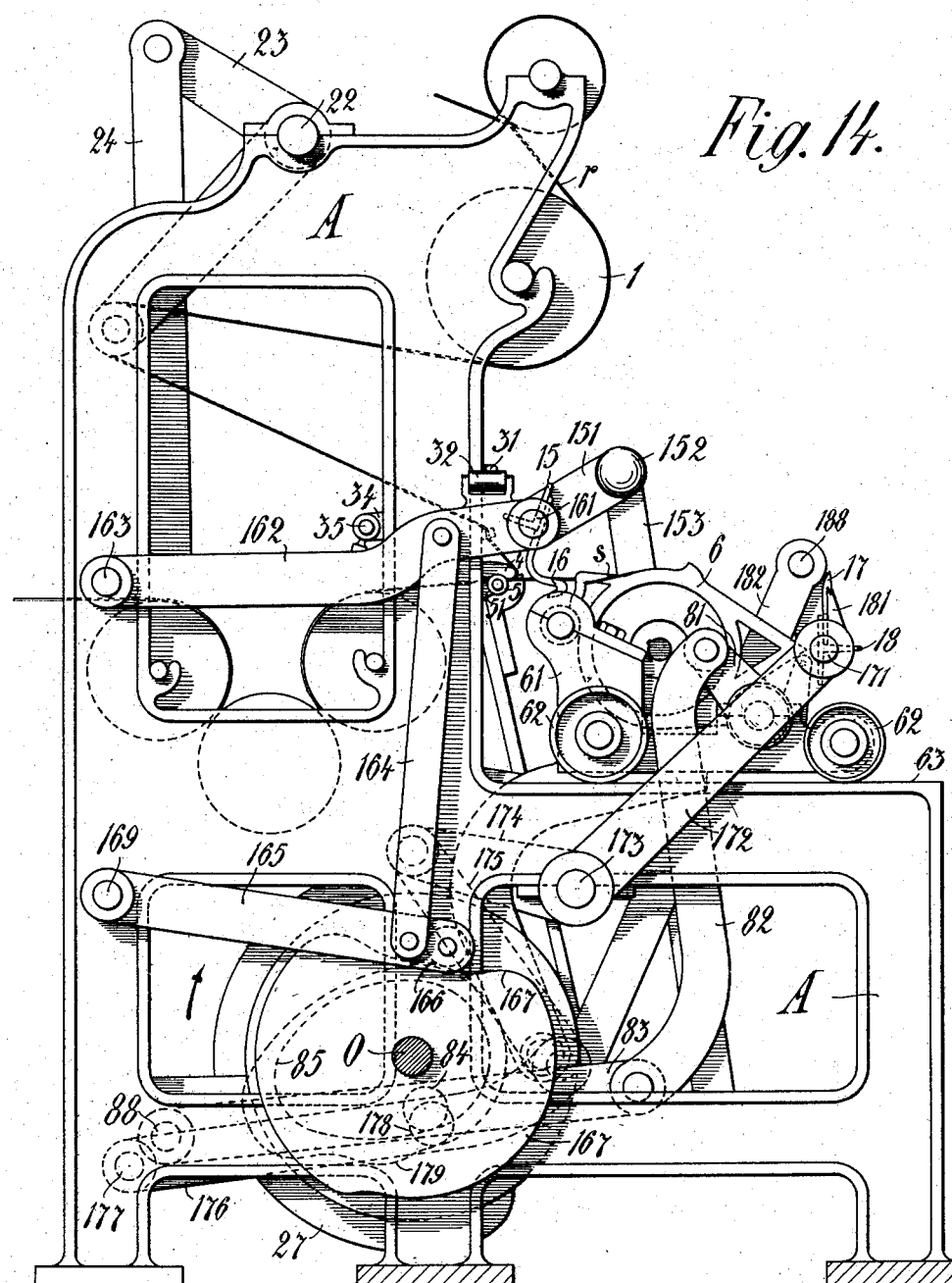
Figure 15:
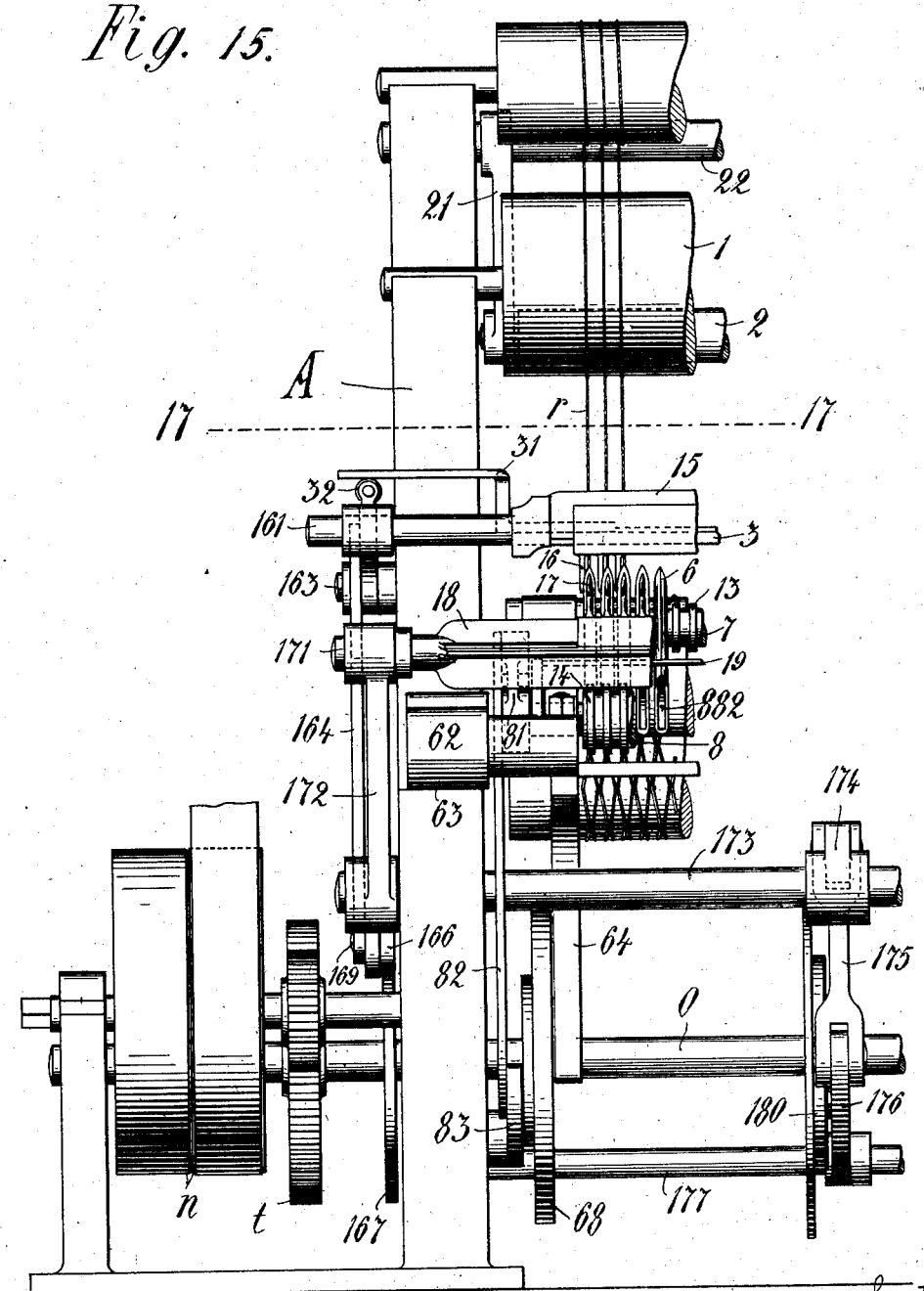
Figure 16:
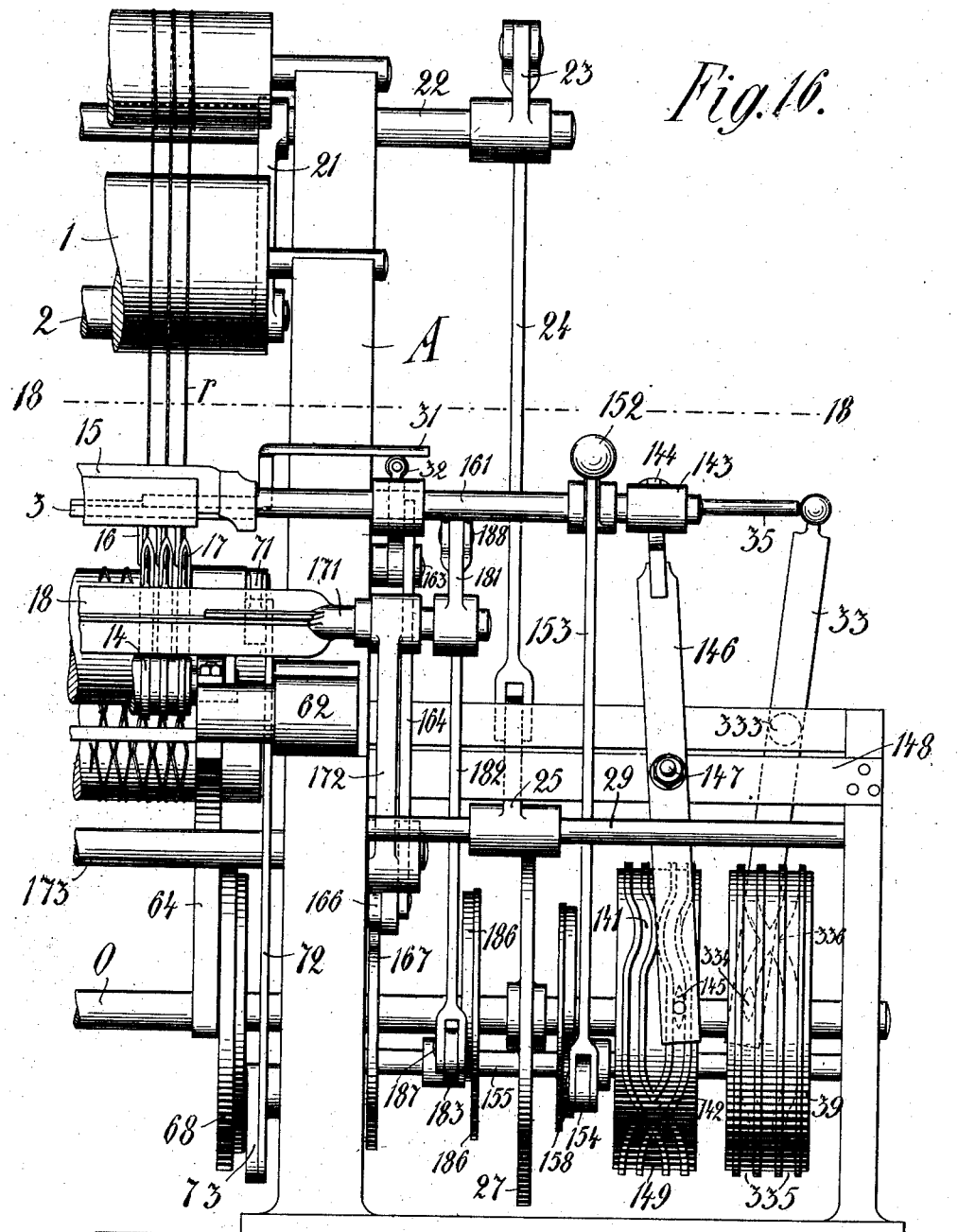
Figure 17:
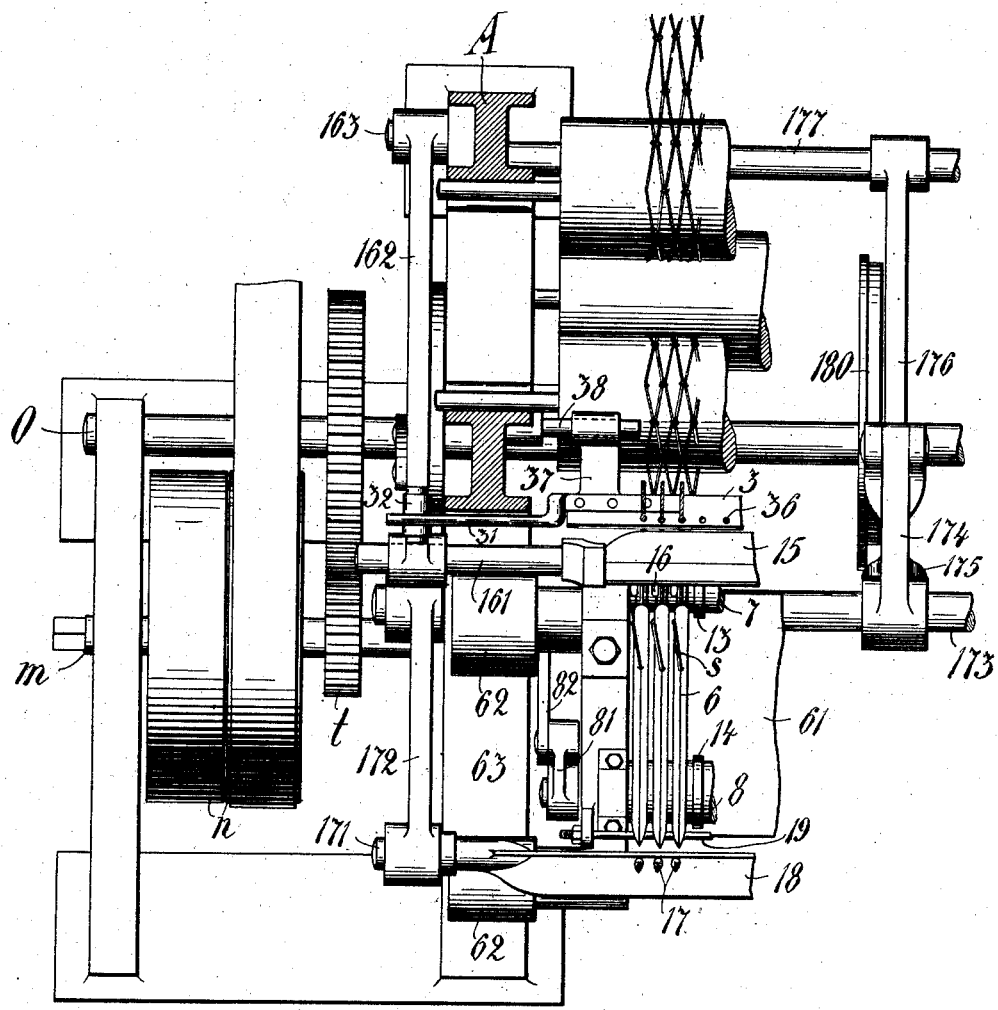

Figures 1 to 9, which are perspective views of one set of the operating-tools of the machine, serve to illustrate the working of these parts in forming a knot. Figs. 10 and 11 are side views, (some of the parts being shown in section,) serving to illustrate the position of the parts in two distinct steps of the operation. Fig. 12 is a detail showing how the shuttle-box is fitted on one of the guide-rolls.
Figs. 13 to 18 are drawings serving to illustrate the general construction of the machine in its preferred form. Fig. 13 is a vertical cross-section. Fig. 13ª is a detail of the tension device, and Fig. 14 is a side view of the machine looking from the left. Fig. 15 is a front view of the left-hand side, and Fig. 16 of the right-hand side, of the machine. Figs. 17 and 18 are corresponding ground plans or horizontal sections on the lines 17 17 and 18 18, Figs. 15 and 16.

Figure 9:
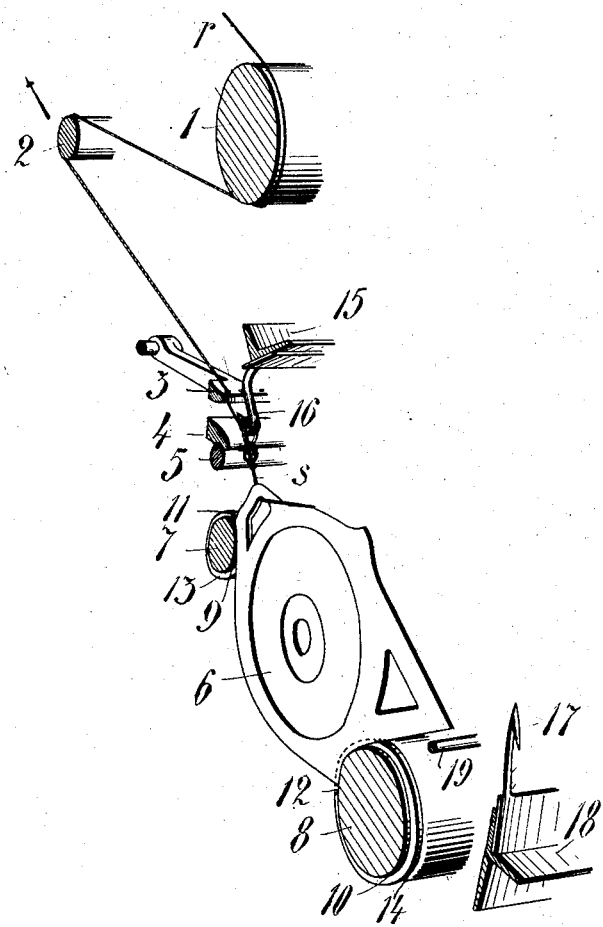

Referring now more particularly to Figs. 1 to 12, we shall first describe the tools used for forming the knots and explain the manner in which they coöperate. In these figures everything is left out which is not necessary for making the description of the operation clear. The warp-thread is fed from a feed-roller or reel (not shown) mounted in rear of the machine and passes first over a friction-roller 1, then rearwardly around a tension-rod 2, capable of swinging to and fro, and then proceeds to a guide-rod 3, provided with a hole for each warp-thread. Said guide-rod is movable longitudinally, as well as in a vertical direction, being to this end secured to pivotally-mounted arms. On leaving said guide-rod 3 the warp-thread passes downwardly and backwardly between a stationary cross-bar 4 and a friction-roller 5, which presses from below against the under side of said cross-bar by the action of springs or weights. The shuttle-thread is also fed to this clamping device from a shuttle-box 6, which is supported by the two shuttle-box guide-rollers 7 and 8. These grooved rollers are mounted on a reciprocating carriage, by the motion of which the shuttle-box will consequently be carried alternately to and from the said clamping device. The guide-rollers 7 and 8 are capable of performing an intermittent rotary motion about their own axis. They are formed, as shown in Figs. 1 to 12, with annular grooves 9 and 10, respectively, serving as seats for the shuttle-box, and also with notches 11 and 12, respectively, in the ribs 13 and 14 between said grooves. 19 is a pusher-rod extending lengthwise of the roller 8 and secured to the shuttle-box carriage so as to move together with the same. 16 is the loop-forming hook, which is carried by the hook-holder 15. The latter has a triplex motion—viz., a rotatory as well as a lifting and a lateral motion. 17 is the warp-thread hook. The same is carried by a holder 18, which is capable both of rotating on its longitudinal axis and of swinging to and fro on a fulcrum located beneath the shuttle-carriage. At the start of the operation, Fig. 1, the shuttle-thread is stretched from the clamping device 4 5 to the shuttle-box, and the loop-forming hook 16 is in such a position beside it as to reach below the thread with the hook proper. The hook-holder now moves the hook laterally in the direction indicated by the arrow, Fig. 1, and then turns it upward to the position shown in Fig. 2. At the end of these motions, Fig. 2, the thread will be lying across the back of the hook, the point of the latter being raised above the thread, so that when the hook is now moved in the opposite direction (arrow, Fig. 2) and then turned downwardly the situation illustrated in Fig. 3 will be produced—that is, the portion of the shuttle-thread adjacent to the shuttle-box will get behind the hook, so that when the latter is thereupon elevated and turned to the position shown in Fig. 4 the thread-bend will on sliding down the back of the hook be turned one hundred and eighty degrees and obtain the form of a loop suspended upon the hook. During the progress of this operation the shuttle-box 6 has at the proper time moved toward the clamping device 4 5 in order to slacken the thread for the formation of the loop. The hook having thus not to pull the thread out from the shuttle in forming the loop this part of the operation may be performed without exposing the thread to undue frictional strains. In the meanwhile the guide-rod 3 has swung upward on its pivot, so as to bring the portion of the warp-thread between said guide-rod and the clamping device 4 in an approximately vertical position immediately behind the formed loop. (See also Fig. 10.) At the same time the warp-thread hook 17 has, as will be seen by reference to Figs. 3 and 4, approached the loop, and the next moment (see Fig. 5) it advances through the same and beyond said vertical portion of the warp-thread. The guide-rod 3 now moves laterally in the direction of the arrow, Fig. 6, whereby, as will be understood from this figure, the thread will be laid across the shank in front of the hooked end of said warp-thread hook 17, so that the latter will take the warp-thread with it through the loop on swinging back over the shuttle-box to the position indicated by dotted lines in Fig. 6. At this time the shuttle-carrier remains yet in its retracted position near to the point of formation of the knot, so as to allow the hook 17 to swing down into the position shown by dotted lines without being in this movement impeded by the rod 19. The movements just described will result in pulling the warp-thread across and to the front of the shuttle-box, as illustrated in Fig. 7, and as the shuttle-carrier now advances (arrow, Fig. 7) the pusher-rod 19 will sweep immediately above the hook 17, thereby pushing the thread-bend off the hook. During the operations just described the tension-rod 2 has swung forward (arrow, Fig. 6) toward the guide-rod 3, so as to release the warp-thread and allow it to form the bend over the shuttle-box. As soon, however, as this thread-bend has been pushed off the warp-thread hook the tension-rod promptly moves in the opposite direction, whereby the thread-bend will be contracted and pulled down the inclining edge 66 of the shuttle-box until it reaches the notch 12 on the roller 8. At this moment the roller is put in rotation, so as to bring the notch from the position of Fig. 7 to that of Fig. 8. By this arrangement the thread is not exposed to great frictional resistance on its passage down the edge forming the abutment of the shuttle-box upon the roller 8. Upon the further motion of the rod 2 the thread-bend is pulled on to the under side of the shuttle-box and caught in a similar way by the notch 11 of the other roller 7, so as to be taken by this roller up to the front of the shuttle-box, after which the rod 2 still moves a short distance, whereby the bend will be pulled close up to the loop of the shuttle-thread, as illustrated in Fig. 9. The knot is now ready for being drawn tight, which operation, after the loop-former has released the loop by swinging down into its original position, Fig. 1, takes place in such a way that the shuttle-carrier, which has meanwhile advanced a little toward the knot from the position in Fig. 7 in order to allow the hook 17 to swing upwardly to resume its vertical position, returns to its original position, Fig. 1, and the net is drawn in as much as half the length of a mesh upon the storing reel or roller, the warp-thread being at the same time tightened over the cross-bar 4 by the tension-rod 2. The tightening of the knot is preceded by a lowering of the guide-rod 3, as will be most clearly seen from Fig. 11. During the operation illustrated in Figs. 5 and 6 said guide-rod must have an elevated position, as shown in Fig. 10. The object in view in lowering the rod to the position in Fig. 11 is to make the angle between the two threads at the knotting-point be as near as possible one hundred and eighty degrees, (or a straight line,) whereby the formation of a running knot (false knot) is avoided. The machine is now ready for forming a new knot, whereby the operations will be repeated as above, with the difference, however, that the guide-rod 3 presents the neighboring warp-thread to the hook 17 in order to effect the knotting of the next row, the knots of which are out of line with those just finished—that is, the shuttle-thread knots alternately to one and then the other of two adjacent warp-threads.

We will now proceed to explain the mechanical constructions employed for imparting to the several tools and tool-holders the motions just described.

The tension-rod 2 is carried by two arms 21 on the shaft 22, which is journaled on top of the frame A. As shown in Figs. 13 and 16, this shaft carries also an arm 23, which is connected with the lift-lever 25 by means of a link 24. The lever 25 is carried by a shaft 29, journaled in the frame, and has a roller 26, which rests on a cam 27, keyed on the axle O, which is the driving-axle of the machine. The form of the cam is such as to give to the lever 25 and through the latter and the links and arms mentioned the rod 2 the oscillatory motion needed for the aforedescribed operation of the machine.

The guide-rod 3 has two motions—one up-and-down motion and one lateral motion. The rod, which is provided with holes 36, one for each warp-thread, is carried by arms 37, Figs. 13, 17, and 18, that are rotatably and longitudinally movable, mounted on pins 38 on the inside of the frame. On each side the rod is provided with laterally-extending arms 31, Figs. 15, 16, 17, and 18, which rest on rollers 32, mounted on top of the arms 162. The up-and-down motion of the guide-rod is imparted to it by these arms 162, so that it moves simultaneously with the latter, which carry the hook-holder 15, and this motion will be described later on. The lateral motion of the guide-rod is imparted to it by means of the rod 35, extending from an extension 34, Figs. 16 and 18, of one of the aforesaid arms 37 to the top of a lever 33, which is journaled at 333 and which is connected with the rod 35 by means of a ball-joint. At the lower end the lever 33 carries a "fish" 334, which extends into a cam-groove 335 on the periphery of the wheel 39 on the driving-axle O. This groove is a double or "loop" groove, it being in fact two grooves, which cross each other at the point 336, so that the fish at this point will run over from one into the other groove for each revolution of the cam, respectively, for each knot tied for the purpose to bring alternately a left and a right hand warp-thread, to be caught by the warp-hook 17, as has been explained above.

The cross-bar 4 is a stationary bar with a cavity 41 along its under side. The friction-roller 5 is mounted close underneath the bar 4 on small arms 51, which are hung on pivots 52 on the inside of the frame and provided with counterweights 53, so as to press the roller 5 up into the cavity 41. In this manner the threads are held in a yielding manner close to the knotting-point. This arrangement is shown in the detail drawings, Fig. 13ᵃ.

The shuttle-box 6 is supported by the rollers 7 and 8, which are journaled on a carrier 61, whose wheels 62 roll upon a plane 63, provided on the frame A. Secured to the under side of the carrier are two arms 64, provided at their lower ends with rollers 65, running in cam-grooves 67 on the wheels 68, which are secured at each end of the axle O. It will be seen that reciprocating motion may in this way be imparted to the carrier.

The guide-rollers 7 and 8 are formed, as shown, with ribs 13 14, each fitting into a recess 882 in each of the shuttle-boxes. Said ribs are provided with notches 11 and 12, respectively, for guiding the warp-thread on the under side of the shuttle-box, the rollers being for this purpose adapted to rotate a corresponding angle. To this end the roller 7 carries an arm 71, Fig. 13, connected at its free end by means of a link 72 with a lever 73, pivotally secured at 77 to the frame A below the axle O. The lever 73 carries a roller 74, working in a cam-groove 75 on the rear face of the disk 68, (on the right-hand side of the machine.) The roller 8 carries an arm 81, Fig. 14, connected in a similar way by a link 82 with a lever 83, having its fulcrum at 88 on the frame A and carrying a roller 84, which works in a cam-groove 85 in the other disk 68, (on the left-hand side of the machine.)

The loop-forming hook 16 is secured to a bar 15 of angular cross-section and which is capable of turning on pivots 161, journaled in the front ends of the levers 162, which are in their turn pivotally secured at 163 to the frame A. The pivots 161 are journaled in the levers 162 in such a way as to be capable both of revolving axially and of sliding longitudinally. The lever 162 is connected with one end of a link 164, whose other end is attached to a lever 165, which is pivotally secured at 169 to the frame A. Mounted on the forward end of this lever is a roller 166, engaged by a cam 167 on the axle O. These means serve, as will be seen, to impart to the loop-forming hook 16 an up-and-down swinging motion on the pivots 163.

Keyed on the right-hand extension of the pivot 161 of the angle-bar 5 is an arm 151, connected by a ball-joint 152 with a link 153, the other end of which is connected with one end of an arm 154, located below the axle O and pivotally mounted on a transverse rod 155, secured to the frame A. The lever 154 has a roller 156, working in a groove 157 in the disk 158, carried by the axle O. These means serve to impart to the hook 16 a swinging motion on the pivots 161.

Secured to the extension of the pivot 161 beyond the arm 151 is also a sleeve 143, connected by a ball-joint 144 with the upper end of a double-armed lever 146, having its fulcrum on a pivot 147, carried by a beam 148, which is secured to the frame A. This lever 146 carries on its other arm a "fish" 145, adapted to run in one or the other cam-grooves on the circumference of the wheel 149, mounted on the axle O. Said grooves are cut so as to form a junction at 142 in order to cause the fish after the knot has been formed to run over from one groove into the other in the same way and for the same purpose as set forth with reference to the wheel 39 and the double-armed lever 33. These means serve to impart a lateral motion to the hook 16 by displacing the hook-holder 15 longitudinally in the arms 162.

The warp-thread hook 17 is secured to a T-iron 18, having pivot-pins 171, journaled in levers 172, keyed on an axle 173, which is journaled in the frame A. Rigidly secured to the axle 173 is also an arm 174, which is connected by a link 175 with the front end of the lever 176, pivotally mounted at its rear end on a transverse rod 177, fast in the frame of the machine. Said lever 176 carries a roller 178, working in a cam-groove 179 in the disk 180, carried by the axle O. These means serve to impart to the hook-holder 18 a swinging motion over the shuttle-box.

Keyed on the extension of the right hand the pin 171 is an arm 181, connected at 188 with a link 182, and the latter has connection at 187 with a lever 183, having its fulcrum on the fixed rod 155 and carrying a roller 184, which runs on a cam-surface 185, formed on a disk 186, fast on the axle O. These means serve to turn the hook-holder 18 on its journals 171.

The cams and cam-wheels are all mounted on a common axle O, journaled in and extending throughout the whole length of the frame A. Motion is translated to this axle by gearing $t$ from the axle $m$, which carries the belt-pulley $n$. In some cases the cam-surfaces in the drawings, for simplicity, are shown as single cams, where, in fact, double cams are used in order to secure positive motions outwardly and inwardly.

We claim—

1. In a net-making machine, a hook capable of forming a loop, mechanism to move the hook with respect to a shuttle-thread to wind said thread around the hook, means to rotate the hook about one end as a center to slip the shuttle-thread from its shank and hold the bight of the loop in its hooked end, and means to insert a thread into the bight of the loop formed, substantially as set forth.

2. In a net-making machine, a hook capable of forming a loop, mechanism to move the hook with respect to a shuttle-thread to wind said thread once around the hook, means to rotate the hook about one end as a center to slip the shuttle-thread from its shank and hold the bight of the loop in its hooked end, means to insert a thread into the bight of the loop formed, and means to bodily raise the hook, substantially as set forth.

3. In a net-making machine, the combination with a loop-forming hook, of a shuttle-carrier, means for feeding the warp, shuttles and means for moving them to and from the hook, means for frictionally holding the finished net during the knotting and means back of the hook for lifting and lowering the warp-thread, substantially as described.

4. In a net-making machine in combination, a hook for forming a loop on the shuttle-thread, means for holding the shuttle-thread and the warp-thread by friction behind the hook, means for raising and lowering the warp-thread, a shuttle-carrier in front of the hook having to-and-fro motion, and a hook for taking a loop of the warp-thread through the shuttle-thread loop to the front of the shuttle-box, substantially as and for the purpose set forth.

5. In a net-making machine, a hook having a bent shank and hooked end, a shuttle, means to move the hook laterally in one direction, means to move the hook end in the arc of a circle, means to move the hook laterally in the other direction, means to bodily raise the hook whereby a shuttle-thread is wound around the hook, slipped off and a twisted loop held by its bight in the hook end, and means to insert a thread into the bight of the loop formed, substantially as set forth.

6. In a net-making machine, the combination with means for feeding and holding the warp-threads, shuttles, and means for forming a loop on the shuttle-thread; of a hook for taking a loop of the warp-thread through the shuttle-thread loop and over the shuttle-box, a rotatable holder in which said hooks are mounted and swinging arms on each side of the machine in which the holder is mounted so as to be capable of attaining a position in front of the shuttles, and means for rotating said holder, substantially as set forth.

7. In a net-making machine, the combination with means for feeding and holding the warp-threads, shuttles and means for forming a loop on the shuttle-thread, a hook for taking a loop of the warp-thread through the shuttle-thread loop and over the shuttle-box, and a shuttle-carrier having a to-and-fro movement on the machine-bed; of a pusher-rod mounted on the shuttle-carrier below the foremost point of the shuttle-box and adapted to push the warp-thread loop off the said hook by a forward movement of the shuttle-carrier, substantially as described.

8. In a net-making machine, a loop-forming hook, provided with a shank having two portions at an angle to one another, means to impart to this hook lateral and vertical rotary movement to loop the shuttle-thread, means to draw the warp-thread through the loop of shuttle-thread and a device to positively disengage the warp-thread after being drawn through the loop, substantially as described.

9. In a net-making machine, means to frictionally hold the net, loop-forming hooks, directly in front of the means to frictionally hold the net, means to laterally move the hooks and vertically rotate them to and from the means to hold the net, means behind the hooks to raise the warp-thread during the formation of the knot and lower it to draw it tight, shuttles movable to and from the hooks, auxiliary hooks to seize the warp-thread and draw it through the loop of shuttle-thread and means to positively disengage the warp-thread from the auxiliary hooks, substantially as described.

10. In a net-making machine, the combination with a shuttle-carriage and shuttles therein; of shuttle-thread loop-formers timed to have lateral, rotary and vertical movement at the required time, thereby forming a loop with the twisted thread near the shuttle and the loop-formers holding the bights, means for frictionally holding the work, a warp-thread guide behind the loop-formers arranged to have substantially vertical movement, a warp-thread tension device and warp-thread hooks each arranged to pass through the loops formed and engage a warp-thread between the means for frictionally holding the work and the warp-thread guides, to draw the warp-threads through said loop and over the shuttles, and means for positively releasing the warp-threads from their hooks, substantially as set forth.

11. In a net-making machine, in combination, a stationary cross-bar, a friction-roller yieldingly held against the same, a warp-thread guide above said cross-bar, a warp-thread tension device movable to and from said guide, loop-formers comprising hooks arranged to be placed alternately opposite each of a pair of warp-threads and arranged to have lateral and vertical motion and rotary motion in a vertical plane, shuttles movable to and from the loop-formers and warp-thread hooks arranged to engage the warp-threads to loop them over the shuttles, substantially as set forth.

12. In a net-making machine, a hook-carrier and loop-forming hooks thereon, a cam-operated lever to laterally shift the carrier, a cam-operated bell-crank lever to rotate the carrier, cam-operated levers to lift the carrier, shuttles, means to move them to and from the hooks, a warp-thread carrier, a warp-thread hook-carrier and hooks thereon, means to rotate said carrier and move it to carry the hooks to and from the warp-threads behind the loop-forming hooks, substantially as set forth.

13. In a net-making machine, the combination with a series of hooks, each capable of engaging a shuttle-thread to form a loop; of guide-rollers 7 and 8, shuttles held on said rollers, means to periodically rotate the rollers, a set of warp-thread hooks, a carrier therefor journaled in rock-levers and means to rotate the carrier, substantially as set forth.

In witness whereof we have hereunto set our hands in presence of two witnesses.

WILLIAM ROBERTON PIHL.
  ANTON OLSEN.

Witnesses:
 ALFRED J. BRYN,
 AUG. OLSEN.